United States Patent
Zeigerson et al.

[11] 3,862,854
[45] Jan. 28, 1975

[54] USE OF BROMINATED SULFURATED LIGNIN FOR FLAMEPROOFING INFLAMMABLE MATERIALS AND FOR THE PRODUCTION OF FLAMEPROOF BONDED ARTICLES

[75] Inventors: Esther Zeigerson, Omer; Moshe Rudolf Bloch, Beer Sheba, both of Israel

[73] Assignee: The State of Isreal, Ministry of Development, Jerusalem, Israel

[22] Filed: Sept. 20, 1972

[21] Appl. No.: 290,581

[30] Foreign Application Priority Data
Sept. 28, 1971  Israel...................................... 37812

[52] U.S. Cl........ 117/136, 21/7, 21/58, 106/15 FP, 117/137, 117/147, 117/148, 260/124
[51] Int. Cl.............................................. B44d 1/26
[58] Field of Search ........... 117/136, 137, 147, 148; 21/7, 58; 106/15 FP; 260/124

[56] References Cited
UNITED STATES PATENTS

| | | | |
|---|---|---|---|
| 3,150,919 | 9/1964 | Lewin | 117/136 |
| 3,378,381 | 4/1968 | Draganov | 117/137 |
| 3,438,959 | 4/1969 | Kim | 260/124 |
| 3,455,895 | 7/1969 | Niilo-Rama et al. | 117/137 |
| 3,459,588 | 8/1969 | Davis | 117/137 |
| 3,464,921 | 9/1969 | Erler et al. | 117/136 |

*Primary Examiner*—William R. Trenor
*Attorney, Agent, or Firm*—Ladas, Parry, Von Gehr, Goldsmith & Deschamps

[57] ABSTRACT

Brominated lignin sulfonate and brominated kraft lignin are used for flameproofing inflammable material. The substrate may be coated or soaked with an aqeuous slurry or alkaline solution of brominated lignin sulfonate or brominated kraft lignin. It is also possible to bond particulate or fibrous inflammable material using a bonding composition containing a prepolymerisate and brominated lignin sulfonate or brominated kraft lignin.

10 Claims, No Drawings

USE OF BROMINATED SULFURATED LIGNIN FOR FLAMEPROOFING INFLAMMABLE MATERIALS AND FOR THE PRODUCTION OF FLAMEPROOF BONDED ARTICLES

The present invention concerns a new method for flame proofing inflammable materials by means of brominated lignin sulfonate or brominated kraft lignin also known as alkali lignin. In one of its specific aspects the invention provides a method of bonding particulate and fibrous materials to yield articles of increased fire resistance employing as bonding agent a composition including brominated lignin sulfonate or kraft lignin.

Lignin sulfonates are obtained from the spent liquors of the sulfite process for wood decomposition while kraft lignins or alkali lignins are obtained from spent liquors, so-called black liquors, of the sulfate process for wood decomposition. Lignin sulfonate and kraft lignin will be referred to hereinafter collectively as "sulfurated lignin."

In the paper industry considerable amounts of sulfurated lignin are obtained as by-products. Hitherto several outlets for these by-products have been found and they are used among others as dispersants, binders, sequestering agents, flotation agents, emulsifiers, emulsion stabilizers, adhesives, water treating agents and the like. However, with all these outlets the amount of sulfurated lignins obtained as by-products in the paper industry exceeds the demand therefor and all paper manufacturers are constantly on the lookout for new outlets for lignin sulfonate.

It is known that sulfurated lignin, e.g., lignin sulfonate, can be halogenated, such a process being described, for example, in U.S. Pat. No. 3,438,959. In that patent specification it is stated that the halogenated lignin sulfonates are useful as intermediates in the formation of other chemical products.

It is further known that the fire resistance of various organic materials may be improved by halogenation. Thus, in accordance with U.S. Pat. No. 3,092,537 the phenolic groups of organic materials of a fibrous nature containing phenolic substances including lignins, tanins and phlobaphenes are flame proofed by halogenation with a gas consisting essentially of a halogen. This procedure is highly inconvenient in that the entire mass to be flameproofed has to be submitted to the halogenation treatment. Furthermore, it has been found that the flame proofing effect obtained in this manner is unsatisfactory.

In accordance with another related process described in U.S. Pat. No. 3,459,588 the flame resistance of a lignin cellulosic product is improved by chlorinating or brominating said product to a chlorine or bromine content of from 2 to 12 percent by weight and thereafter reacting the chlorinated or brominated products with a trialkyl or triaryl phosphite or phosphonate at a temperature of from 100° to 150°C. This process suffers from the same drawbacks as the one disclosed in U.S. Pat. No. 3,092,537.

It has furthermore already been proposed to incorporate sulfurated lignin in fire proofing compositions. Such a method is disclosed in U.S. Pat. No. 3,464,921 according to which calcium lignin sulfonate is combined with various other materials such as protein powder, magnesia usta levissima, talcum powder, $B_2O_3$, $Na_2B_4O_7$, NaCl, KCL, $BaCl_2$, $CaHPO_4$, $NaHCO_3$ and a hydrophobing agent. The function of the lignin sulfonate in these compositions is presumably of a secondary nature.

In accordance with the present invention it has surprisingly been found that brominated sulfurated lignin is a highly effective fire retarding agent. Consequently, in its broadest aspect the invention consists in a method of flame-proofing inflammable material comprising incorporating in such material a brominated sulfurated lignin.

Preferably, the amount of brominated sulfurated lignin incorporated in said inflammable material is so chosen that at least 3 percent by weight of bromine is present in the final, flame-proofed product.

In accordance with one of the embodiments of the invention the inflammable material is coated or soaked with an aqueous slurry or alkaline solution of brominated sulfurated lignin and is then dried.

It has furthermore surprisingly been found in accordance with the present invention that brominated sulfurated lignin can be combined with a bonding composition, e.g., urea-formaldehyde or phenol-formaldehyde prepolymerisate, to yield a flame-proofing bonding composition. The bonding and flame-proofing capacity of the composition is based on the hitherto unknown property of brominated sulfurated lignin to be capable of copolymerizing with bonding compositions such as prepolymerized urea-formaldehyde or phenol-formaldehyde to yield a stable interpolymer with flame proofing properties. Such copolymerization is presumably due to the phenolic groups of the lignin moieties.

Thus, the invention further provides flame-proofing bonding compositions containing a prepolymerisate and brominated sulfurated lignin. Examples of prepolymerisates are urea-formaldehyde and phenol-formaldehyde prepolymerisates.

The above bonding compositions may be used for the production of various bonded articles of desired shapes and sizes from particulate material such as fibres, chips, granules, sawdust and the like. Examples of such bodies are particle or chip boards, fibre boards and the like. Such bodies will be referred to hereinafter for short as "bonded articles."

The invention does also provide a method for the production of bonded articles comprising admixing particulate or fibrous material with a bonding composition comprising a prepolymerisate and brominated sulfurated lignin and pressing the mixture. If desired, the mixture may be heated during pressing although in many cases this may not be required. Also a polymerization accelerator is in many cases not required. Examples of prepolymerisates are urea-formaldehyde and phenol-formaldehyde prepolymerisates.

Brominated lignin sulfonate and brominated kraft lignin are obtained by bromination of lignin sulfonate and kraft lignin, respectively. The bromination may be effected with molecular bromine or with bromine in status nascendi obtained by oxidation from a bromide solution in which the lignin sulfonate is dispersed. The oxidation of the bromide ion to elementary bromine may be effected chemically, e.g., with chlorine, or electrochemically.

The following are examples of the preparation of brominated lignin sulfonate and brominated kraft lignin for use in accordance with the invention.

EXAMPLE 1

Lignin sulfonate or kraft lignin is suspended in water to form a 25 percent by weight slurry and bromine is added gradually. As the bromine is added the temporary colouration of the water caused by the added bromine disappears due to the bromine consumption. The reaction is terminated when bromine remains unconsumed in the solution. This may be determined by any conventional method. After the completion of the reaction the product brominated lignin sulfonate or brominated kraft lignin is filtered off and dried at a temperature below 100°C. and is subsequently ground.

The mother liquor contains HBr formed in the course of the reaction and, if desired, it may be worked up for the recovery of bromine.

EXAMPLE 2

The procedure of Example 1 is repeated using, however, only half the amount of bromine required. Thereafter gaseous chlorine is bubbled through the slurry whereby the bromide stemming from HBr formed in the first part of the reaction is oxidized and further brominates the lignin sulfonate or kraft lignin.

In either of the above two examples it is possible to use instead of pure water for slurrying the lignin sulfonate or kraft lignin starting material an electrolyte solution such as a 15% NaCl solution, a waste HBr solution and the like. The use of these solutions may be advantageous in that the losses of elementary bromine are reduced.

In the following description the invention will be more specifically described with reference to brominated lignin sulfonate termed Orzan M3, and brominated kraft lignins termed Indulin 430, Indulin 450a and Indulin 450b.

Orzan M3 is a brominated lignin sulfonate obtained by bromination with liquid bromine of a 30 percent slurry of Orzan AH–3 in 1N $K_2SO_4$ solution. Orzan AH–3 is a trade designation of a lignin sulfonate product obtained from the Crown Zellerbad Company.

Indulin 430 is a brominated kraft lignin obtained by bromination with liquid bromine of a 30 percent slurry of Indulin AT in an acidic solution containing 13.6 percent by weight of HBr and 6.7 percent of HCl. Indulin AT is a trade designation of kraft lignin obtained from the Westvaco Company.

Indulin 450a is a brominated kraft lignin obtained by bromination with liquid bromine of a 30 percent slurry of Indulin AT (see above) in water.

Indulin 450b is obtained by holding Indulin 450a in a dessicator containing $NH_4OH$.

The properties of the above products are summed up in the following Table 1. In this Table and hereinafter B.S.L. is used for brominated sulfurate lignin.

TABLE I

| Type of B.S.L. | Total Bromine (%) | Soluble bromide (%) | pH (0.1 g/50 ml $H_2O$) |
|---|---|---|---|
| Orzan M3 | 38.0 | 16.4 | 2.4 |
| Indulin 430 | 34.3 | 2.2 | 3.2 |
| Indulin 450a | 33.0 | 2.4 | 3.2 |
| Indulin 450a | 33.0 | 2.4 | 8.2 |

As mentioned it has been discovered in accordance with the present invention that brominated sulfurated lignin copolymerizes readily with urea-formaldehyde prepolymerisate to yield a fire resistant product. Surprisingly such copolymerization proceeds more readily than if the said urea-formaldehyde prepolymerisate were cured by itself. This follows from the following Table II.

TABLE II

Influence of B.S.L. on Time of Polymerization of Urea-Formaldehyde

| Type of B.S.L. | Amount B.S.L. (%) | Amount of Urea formaldehyde | Accelerator (%) | Time of polymerization | Remarks |
|---|---|---|---|---|---|
| — | — | 100 | 3 | 3 min. 180° | No polymerization at room temp. |
| Orzan AH-3 non-brominated | 10 | 90 | 3 | 3 days | |
| Orzan M3 | 10 | 90 | 3 | 1 min. | The reaction is exothermic |
| Orzan M3 | 10 | 90 | — | 3 min. | The reaction is exothermic |
| Indulin 430 | 10 | 90 | — | 3 hrs. | |
| Indulin 450a | 10 | 90 | — | 5 hrs. | |
| Indulin 430 | 50 | 50 | 3 | 4 min. | |
| Indulin 450a | 50 | 50 | — | 5 min. | |
| Indulin 430 | 50 | 50 | — | 4.5 min. | |
| Indulin 450a | 30 | 70 | — | 10 min. | pH = 3.2 |
| Indulin 450b | 30 | 70 | — | a few days | pH = 8.2 |

From the above Table the following becomes apparent:

1. B.S.L. accelerates the polymerization of urea-formaldehyde and eliminates the need to use additional heating due to the exothermicity of the reaction.

2. B.S.L. enables to perform the polymerization without the need of an accelerator. Conventionally $NH_4Cl$ and/or $NH_4OH$ are used as accelerators in the curing of uear-formaldehyde prepolymerisates. 3. It is possible to control the velocity of the polymerization as needed by adjusting the pH of the B.S.L. (compare two last items in the Table).

B.S.L. also accelerates the rate of polymerization of phenol-formaldehyde prepolymerisates, although the effect is less pronounced than in the case of urea-formaldehyde prepolymerisates. This follows from Table III below.

TABLE III

| Type of B.S.L. | Amount of B.S.L. (%) | Amount of phenol-formaldehyde (%) | Accelerator (%) | Time of polymerisation at 180°C (min) | Remarks |
| --- | --- | --- | --- | --- | --- |
| — | — | 100 | 3 | 36 | No polymerization occurred at room temp. |
| Orzan M3 | 5 | 95 | 3 | 21 | |
| Orzan M3 | 7.5 | 92.5 | 3 | 18 | No polymerization occurred at room temp. |
| Orzan M3 | 10 | 90 | 3 | 14 | |

B.S.L. by itself, urea-formaldehyde-B.S.L. interpolymers and phenol-formaldehyde-B.S.L. interpolymers, which interpolymers are obtained from the corresponding prepolymerisate compositions as shown above, impart to inflammable materials such as wood, paper, textiles, bonded articles (as herein defined) and many more, a high degree of fire resistance. This is demonstrated by the following experiments:

In one set of experiments commercial particle boards obtained from Levidei Ashkelon, Ashkelon, Israel, (hereinafter Ashkelon particle boards) were coated and soaked with an aqueous B.S.L. slurry.

In another set of experiments mixtures containing urea-formaldehyde, wood chips and B.S.L. were prepared. A laboratory press of 1 cm² area was used to prepare the product at pressures of 5,000 to 10,000 p.s.i. The product was in each case tested to compare its burning and hardness characteristics with a non-treated Ashkelon particle board.

The particulars of these experiments and the results obtained are summed up in the following Table IV in which U.F. stands for urea-formaldehyde. The experiments were repeated with Orzan M3, Indulin 430 and Indulin 450a and the results of the burning and hardness tests given are average values from the experiments. B.S.L. in Table IV thus refers to any of the above brominated sulfurated lignins.

The vertical burning tests were performed by ASTM D 16-92-59 T standard. After ignition time of 3.0 seconds, the flame was removed and the duration of continued flaming of material was timed.

In an additional set of experiments lightweight cardboard was impregnated by soaking using a 9.3 percent by weight solution of Indulin 450a and Orzan M3 in 1N NaOH. Burning experiments were carried out on the original and the impregnated lightweight cardboard according to the standard flammability test method ASTM D-777-46. The following results were obtained:

TABLE V

| Material | B.S.L. in solution | Burning ASTM test (sec) | Remarks |
| --- | --- | --- | --- |
| Original cardboard | — | 20 | Totally consumed |
| Impregnated cardboard | Indulin 450a | 0 | Average 9 mm was slightly burned |
| Impregnated cardboard | Orzan M3 | 0 | Average 11 mm was slightly burned |

We claim:
1. A method of flame proofing inflammable material comprising incorporating in or coating said material with an effective amount of a brominated sulfurated lignin.

TABLE IV

Burning and Hardness Tests of Particle Boards containing B.S.L.

| Type of material | Composition | Temp. used in production | Pressure p.s.i. | Burning ASTM test (sec) | Hardness test Barcol (935) | Remarks |
| --- | --- | --- | --- | --- | --- | --- |
| Ashkelon Particle Boards | 25% U.F. 3% accelerator* 72% wood chips | 180°C | 10000 | 8–34 | 45–50 | Continues internal burning 3 min. |
| Ashkelon Particle Boards coated with B.S.L. slurry | 25% U.F. 3% accelerator* 72% wood chips | 180°C | 10000 | 2 | | Trace of internal burning |
| Ashkelon Particle Boards swelled in a B.S.L. slurry | 25% U.F. 3% accelerator* 72% wood chips | 180°C | 10000 | 0 | | No internal burning |
| Laboratory Particle Boards | 15% U.F. 15% B.S.L. 70% wood chips | room temp. | 5000 | 0 | 50–60 | No internal burning |

TABLE IV — Continued

Burning and Hardness Tests of Particle Boards containing B.S.L.

| Type of material | Composition | Temp. used in production | Pressure p.s.i. | Burning ASTM test (sec) | Hardness test Barcol (935) | Remarks |
|---|---|---|---|---|---|---|
| Laboratory Particle Boards | 15% U.F. 15% B.S.L. 70% wood chips | room temp. | 5000 | 0 | 55–60 | No internal burning |

*a buffer solution of pH 8.8 containing $NH_4Cl$ and $NH_4OH$.

| Type of material | Composition | Temp. used in production | Pressure p.s.i. | Burning ASTM test (sec) | Hardness test Barcol (935) | Remarks |
|---|---|---|---|---|---|---|
| Laboratory Particle Boards | 15% U.F. 15% B.S.L. 70% wood chips | room temp. | 5000 | 0 | 35–60 | No internal burning |
| Laboratory Particle Boards | 12% U.F. 10% B.S.L. 78% wood chips | room temp. | 5000 | 1–2 | 40–48 | No internal burning |
| Laboratory Particle Boards | 15% U.F. 10% B.S.L. 75% wood chips | room temp. | 5000 | 0.8–2 | | No internal burning |
| Laboratory Particle Boards | 15% U.F. 15% B.S.L. 70% wood chips | room temp. | 10000 | 0 | 40–60 | No internal burning |

2. A method according to claim 1, wherein said material is coated with an aqueous slurry or alkaline solution of brominated sulfurated lignin and is then dried.

3. A method according to claim 1, wherein said incorporation is an impregnation of the material with an aqueous slurry or alkaline solution of brominated sulfurated lignin and then drying.

4. A method according to claim 1, wherein a bonded article is produced from particulate or fibrous inflammable material and said incorporating comprises admixing said particulate or bonded material with a bonding composition comprising a prepolymerisate and brominated sulfurated lignin, and pressure-curing the mixture.

5. A method according to claim 4, wherein said prepolymerisate is a urea-formaldehyde prepolymerisate.

6. A method according to claim 4, wherein said prepolymerisate is a phenol-formaldehyde prepolymerisate.

7. A method according to claim 4, wherein said particulate or fibrous inflammable material is wood.

8. A method according to claim 1, wherein the amount of brominated sulfurated lignin is at least 3 percent by weight of bromine present in the final, flameproofed product.

9. A flameproofed article of manufacture comprising an inflammable material impregnated with an effective amount of a brominated sulfurated lignin as a flame proofing composition.

10. Articles of manufacture comprising bonded particulate or fibrous material, containing an effective amount of brominated sulfurated lignin as a flame proofing composition incorporated in the bonding agent.

* * * * *